(12) United States Patent
Minemura et al.

(10) Patent No.: US 6,654,325 B1
(45) Date of Patent: Nov. 25, 2003

(54) TRIAL WRITING METHOD AND OPTICAL DISK SYSTEM USING THE SAME

(75) Inventors: Hiroyuki Minemura, Kokubunji (JP); Hiroyuki Tsuchinaga, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/914,427

(22) PCT Filed: Aug. 9, 1999

(86) PCT No.: PCT/JP99/04291
§ 371 (c)(1),
(2), (4) Date: Nov. 29, 2001

(87) PCT Pub. No.: WO01/11614
PCT Pub. Date: Feb. 15, 2001

(51) Int. Cl.[7] ................................. G11B 7/00
(52) U.S. Cl. ................. 369/47.28; 369/59.1; 369/59.2
(58) Field of Search ................. 369/47.1, 47.15, 369/47.28, 47.29, 47.48, 53.1, 53.11, 53.34, 59.1, 59.2, 60.01

(56) References Cited

U.S. PATENT DOCUMENTS 5,751,689 A * 5/1998 Hoshino et al. ......... 369/275.3
6,269,062 B1 * 7/2001 Minemura et al. ....... 369/47.53

FOREIGN PATENT DOCUMENTS

| EP | 865 035 | 9/1998 |
|---|---|---|
| JP | 4-137224 | 5/1992 |
| JP | 6-52547 | 2/1994 |
| JP | 6-236553 | 8/1994 |
| JP | 8-124163 | 5/1996 |
| JP | 9-081937 | 3/1997 |
| JP | 10-40647 | 2/1998 |
| WO | WO97/14143 | 4/1997 |

* cited by examiner

Primary Examiner—Muhammed Edun
(74) Attorney, Agent, or Firm—Mattingly, Stanger & Malur, P.C.

(57) ABSTRACT

A method of recording information on an information medium, especially on an optical recording medium with light. It has been hard to determine optimum power accurately due to the influence of the linearity and the mark length dependence on rewrite deterioration when a write parameter calibration on a phase change optical disk is performed by a conventional asymmetry method prior to information recording. According to the present invention, a single pattern or a random pattern is recorded on an information medium, and the difference between the clock and the data edge is detected using a reproduced signal. On the basis of this difference, the threshold power of the recording is determined and multiplied by a constant to optimize the recording power.

6 Claims, 15 Drawing Sheets

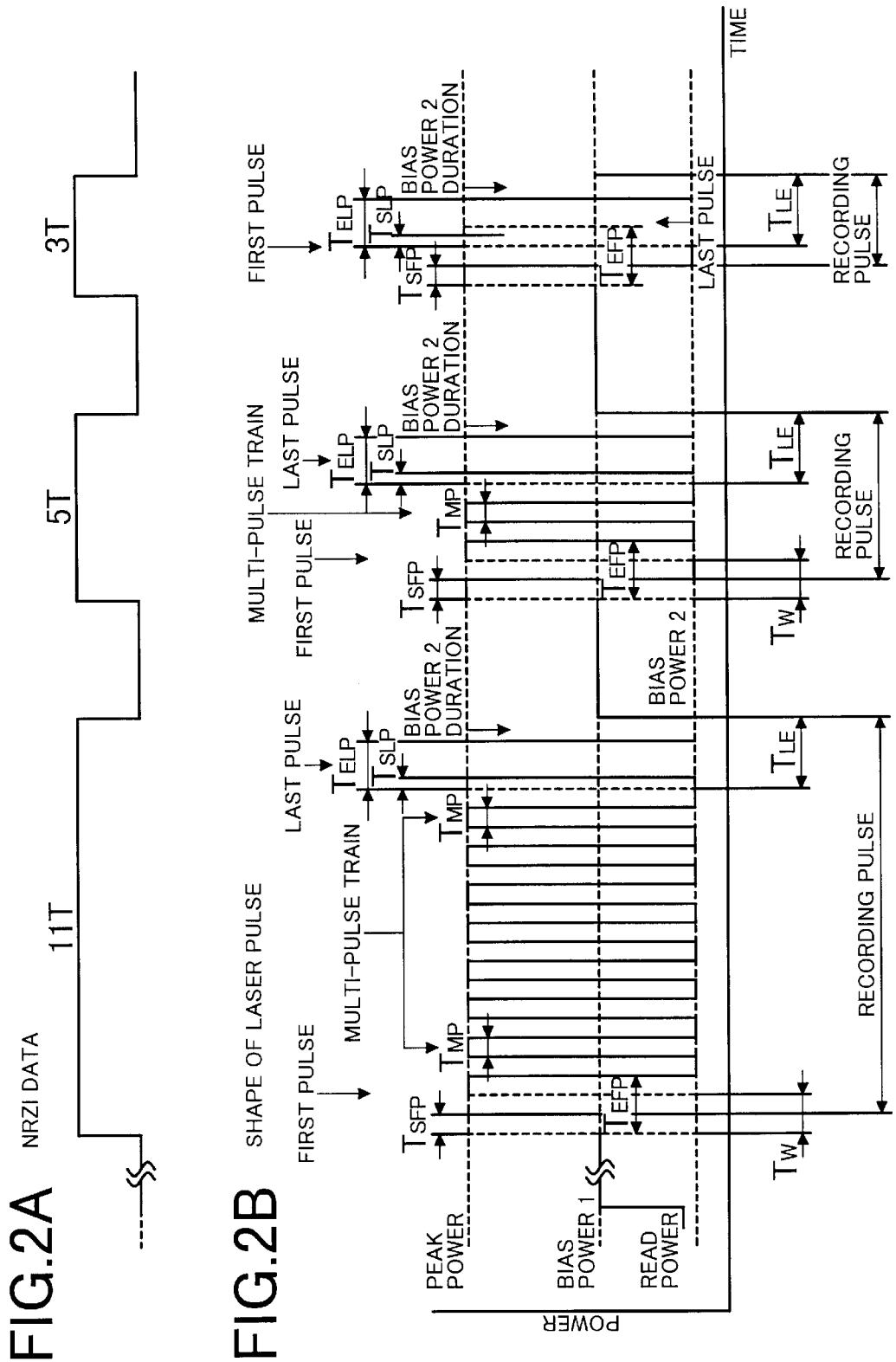

FIG.6

Leading Edge Control factors

|  | $m \geq 6$ | m=5 | m=4 | m=3 |
|---|---|---|---|---|
| $s \geq 6$ | F0 | F1 | F2 | F3 |
| s=5 | F4 | F5 | F6 | F7 |
| s=4 | F8 | F9 | F10 | F11 |
| s=3 | F12 | F13 | F14 | F15 |

Trailing Edge Control factors

|  | $m \geq 6$ | m=5 | m=4 | m=3 |
|---|---|---|---|---|
| $s \geq 6$ | T0 | T1 | T2 | T3 |
| s=5 | T4 | T5 | T6 | T7 |
| s=4 | T8 | T9 | T10 | T11 |
| s=3 | T12 | T13 | T14 | T15 |

FIG.7

| PATTERN NO. | PATTERN CONFIGURATIONS ||||||  BYTE NUMBER |
|---|---|---|---|---|---|---|---|
| | MARK | SPACE | MARK | SPACE | MARK | SPACE | |
| 1 | 11 | 3 | 3 | 6 | 10 | 15 | 3 |
| 2 | 11 | 4 | 3 | 6 | 10 | 14 | 3 |
| 3 | 11 | 5 | 3 | 6 | 10 | 13 | 3 |
| 4 | 11 | 6 | 3 | 6 | 10 | 12 | 3 |
| 5 | 11 | 3 | 4 | 6 | 9 | 15 | 3 |
| 6 | 11 | 4 | 4 | 6 | 9 | 14 | 3 |
| 7 | 11 | 5 | 4 | 6 | 9 | 13 | 3 |
| 8 | 11 | 6 | 4 | 6 | 9 | 12 | 3 |
| 9 | 11 | 3 | 5 | 6 | 8 | 15 | 3 |
| 10 | 11 | 4 | 5 | 6 | 8 | 14 | 3 |
| 11 | 11 | 5 | 5 | 6 | 8 | 13 | 3 |
| 12 | 11 | 6 | 5 | 6 | 8 | 12 | 3 |
| 13 | 11 | 3 | 6 | 6 | 7 | 15 | 3 |
| 14 | 11 | 4 | 6 | 6 | 7 | 14 | 3 |
| 15 | 11 | 5 | 6 | 6 | 7 | 13 | 3 |
| 16 | 11 | 6 | 6 | 6 | 7 | 12 | 3 |
| 17 | 11 | 6 | 3 | 3 | 10 | 15 | 3 |
| 18 | 11 | 6 | 3 | 4 | 10 | 14 | 3 |
| 19 | 11 | 6 | 3 | 5 | 10 | 13 | 3 |
| (20) | 11 | 6 | 3 | 6 | 10 | 12 | 3 |
| 21 | 11 | 6 | 4 | 3 | 9 | 15 | 3 |
| 22 | 11 | 6 | 4 | 4 | 9 | 14 | 3 |
| 23 | 11 | 6 | 4 | 5 | 9 | 13 | 3 |
| (24) | 11 | 6 | 4 | 6 | 9 | 12 | 3 |
| 25 | 11 | 6 | 5 | 3 | 8 | 15 | 3 |
| 26 | 11 | 6 | 5 | 4 | 8 | 14 | 3 |
| 27 | 11 | 6 | 5 | 5 | 8 | 13 | 3 |
| (28) | 11 | 6 | 5 | 6 | 8 | 12 | 3 |
| 29 | 11 | 6 | 6 | 3 | 7 | 15 | 3 |
| 30 | 11 | 6 | 6 | 4 | 7 | 14 | 3 |
| 31 | 11 | 6 | 6 | 5 | 7 | 13 | 3 |
| (32) | 11 | 6 | 6 | 6 | 7 | 12 | 3 |
| TOTAL | | | | | | | 96 |

TRIAL WRITING METHOD AND OPTICAL DISK SYSTEM USING THE SAME

TECHNICAL FIELD

The present invention relates to an information recording/reproducing apparatus using an information recording medium capable of recording information by irradiation with optical beams, and more particularly to an information recording apparatus for improving an error rate to a phase change optical disk.

BACKGROUND ART

As a conventional rewritable optical disk, there is known a DVD-RAM realizing a storage capacity of 2.6 GB on a single side of a disk having a diameter of 120 mm made of a phase change material.

In JP-A-10-320777, there is disclosed a write parameter calibration technology for optimizing recording power since there is a need for executing a precise formation of a recorded mark for a large capacity optical disk such as a DVD-RAM.

The conventional write parameter calibration comprises the following processes:

(1) Process of recording a test pattern on a disk while changing recording power.

(2) Process of detecting a phase difference between a data edge and a clock edge at reproduction and acquiring optimum recording power by determining threshold power of recording in which a phase difference is equal to or lower than a given value and multiplying it by a constant.

With these processes, the recording power can be acquired with accuracy of about ±3% of the optimum condition.

DISCLOSURE OF INVENTION

Referring to FIG. 2, there is shown a recording strategy used for a 2.6 GB DVD-RAM. To further increase a recording capacity of a rewritable optical disk, it is indispensable to write a recorded mark having a half or smaller size of an optical spot more precisely. To form a fine mark very precisely in this manner, a medium need be irradiated with beams while changing power or a pulse width adaptively according to data patterns preceded or followed by the recorded mark as well as using optical pulses synchronized with clocks as shown in FIG. 2. For example, to change width W of a pulse string adaptively as a recording condition, W=W (—, a previous space length, the mark length, a subsequent space length, —).

Referring to FIG. 3, there is shown the write parameter calibration method disclosed in JP-A-10-320777 as a conventional art. In the conventional write parameter calibration method, the recording power has been determined by evaluating a phase difference between data and a clock as an error count while changing the recording power. In the conventional one, it was impossible to determine a recording condition of power or a pulse width according to previous and subsequent data patterns as set forth in the above.

It is an object of the present invention to provide an optical disk drive for further increasing a recording capacity of an optical disk, specifically to provide a write parameter calibration method used prior to actual recording of information to realize of a large amount of recording. Particularly, it is an object of the present invention to provide a write parameter calibration method for realizing an improvement of power determination accuracy and an optimization of the recording condition depending on previous and subsequent data patterns and an optical disk drive using the method.

To resolve the above problem, the following write parameter calibration method and an optical disk drive using it are used.

(1) Write parameter calibration method, comprising:
a process of recording data patterns on an information medium while controlling a recording condition according to the recording data patterns;
a process of reading the data patterns recorded on the information medium to acquire a reproduced signal;
a process of detecting a phase difference between the reproduced signal and a reference signal;
a process of discriminating the phase difference for classification according to the data patterns; and
a process of determining the recording condition according to the discriminated phase difference.

(2) Write parameter calibration method, comprising:
a process of recording the data patterns on an information medium while controlling the recording condition according to recording data patterns;
a process of reading the data patterns recorded on the information medium to acquire a reproduced signal;
a process of measuring the number of marks or of spaces included in the reproduced signal;
a process of comparing the number of marks or of spaces in the reproduced data with the number of marks or of spaces in the recorded data; and
a process of determining the recording condition according to a result of the comparison.

(3) Write parameter calibration method according to (1) or (2) in the above,
wherein the information medium is a disk-type optical information recording medium;
wherein the reference signal is a clock signal generated from the reproduced signal; and
wherein the recording condition is power, a pulse width, or a position of an emitted laser beam.

(4) An optical disk drive, which is an information device for recording and reproducing information on an optical information recording medium, at least comprising:
means for rotating the optical information recording medium;
means for condensing semiconductor laser beams into the optical information recording medium; and
laser driving means for modulating an output, a pulse width, or a position of the semiconductor laser according to the recorded data,
wherein it has a function of determining a condition for recording into the optical information recording medium using the write parameter calibration method according to (1), (2), or (3).

(5) An optical disk drive according to the above (4), further comprising:
means for recording the recording condition determined by the write parameter calibration into a specific area of the optical information recording medium; and
means for reproducing the recording condition recorded on the optical information recording medium.

The present invention is also applicable to a write-once optical disk of an optical magnetic disk type or of a perforation type as well as the phase change optical disk.

BRIEF DESCRIPTION OF THE DRAWINGS

FIG. 2 is a parameter diagram showing a recording waveform;

FIG. 6 is a diagram showing a parameter table used for the adaptive control;

FIG. 7 is a diagram showing recording data patterns for measuring an edge shift amount of the recorded mark conforming to the parameter table used for adaptive control;

BEST MODE FOR CARRYING OUT THE INVENTION

Figure 1:
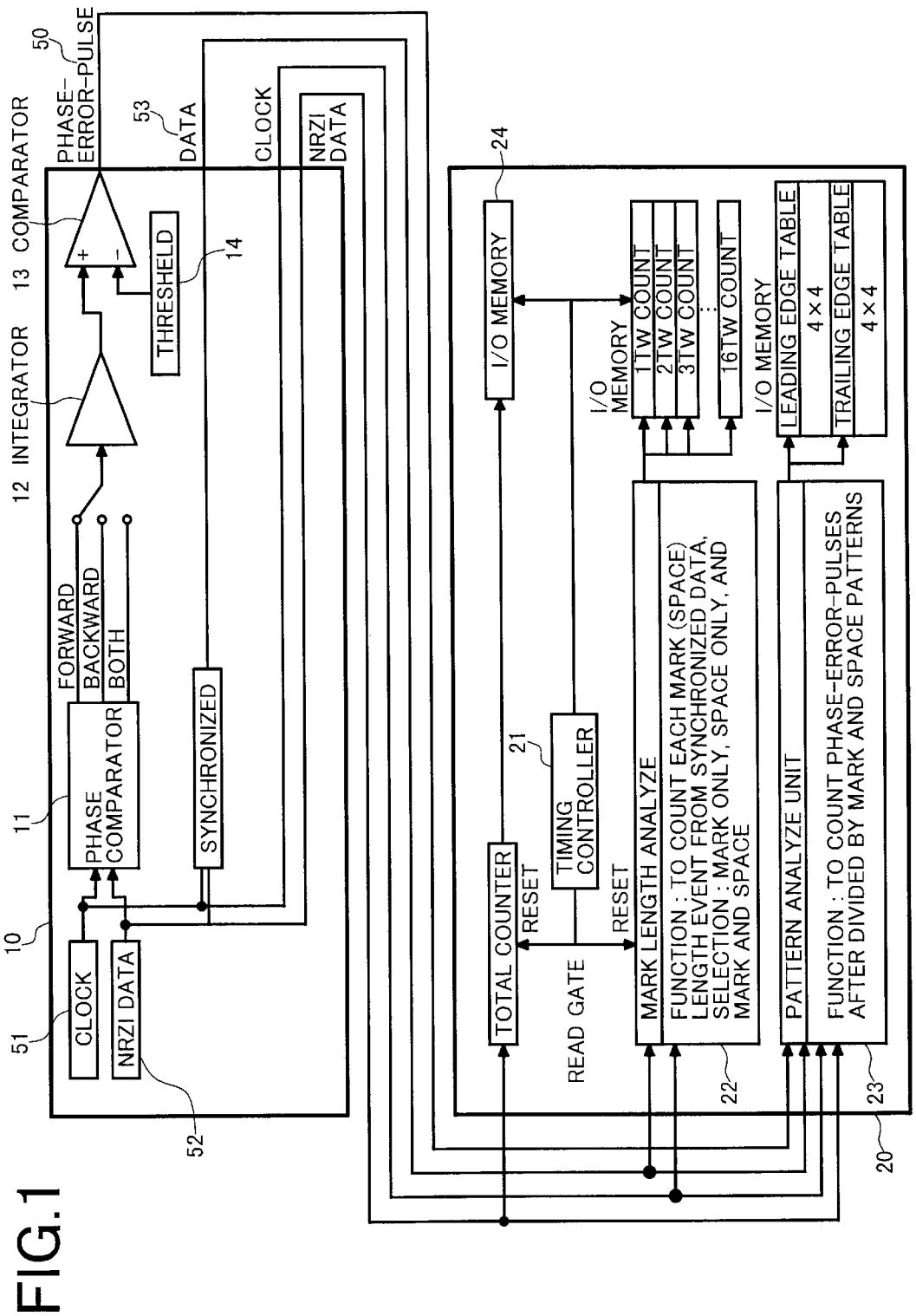
FIG. 1 is a block diagram of a circuit for measuring a phase difference between data and a clock in the present invention.
Figure 3A:
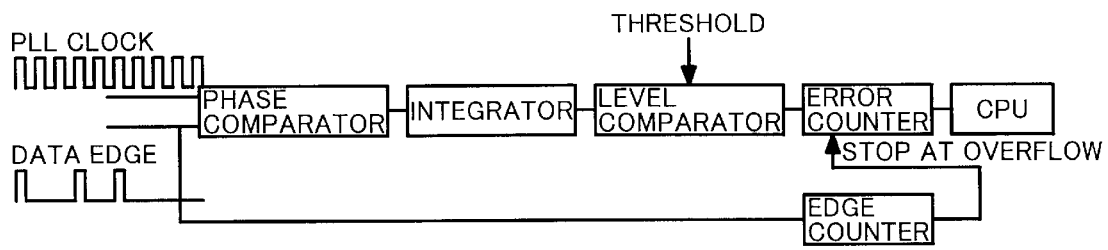
FIG. 3 is a diagram showing a write parameter calibration method in the conventional art.
Figure 3B:
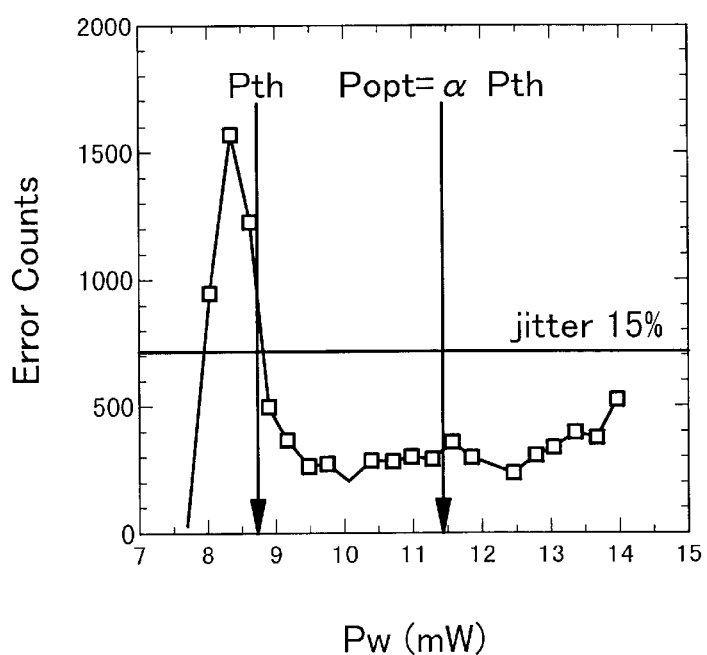

Reference numerals in accompanying drawings used for describing the present invention designate the following:

An address 5, an address 6, a light spot 7, an optical disk medium 8, an analog section 10, a phase comparator 11, an integrator 12, a comparator 13, a threshold 14, a digital section 20, a timing controller 32, a mark length analyze unit 22, an I/O memory 24, an error pulse 50, a clock 51, NRZI data 52, data 53, a light 122, a reflected light 123, a reproduced signal 130, a light source 131, an objective lens 132, a photo-detector 133, a CPU 151, a motor 162, a light intensity controller 171, a read channel 191.

First embodiment

A write parameter calibration method comprises steps of determining a condition of minimizing a phase difference between respective edges for a correction amount of a pulse width, fetching a shift amount of the edges of a recorded mark as a phase error pulse, classifying phase error pulses on tables by mark and space patterns, and determining a condition of minimizing a shift amount corresponding to each table. The write parameter calibration method is described in detail below.

Referring to FIG. 1, there is shown a block diagram of a circuit for measuring a phase difference between data and a clock preferable for realizing the present invention. The phase difference measuring circuit comprises the analog section 10 and the digital section 20. The analog section 10 uses the NRZI data 52 as input information with a binary signal of the clock 51 and the data generated from a reproduced signal. The phase comparator 11 compares a phase of the clock 51 with that of the NRZI data 52 and generates a forward pulse, a backward pulse, or both (the logical OR of the forward pulse and the backward pulse) of the NRZI data 52 to the clock data 51. A pulse width of them is a phase difference. The integrator 12 integrates selected one of the forward, backward, and both pulses and converts the pulse width to a voltage level to acquire a phase difference voltage. The comparator 13 compares the phase difference voltage with the threshold 14 and generates a single phase error pulse 50 when the phase difference voltage is greater than the threshold 14, in other words, when the phase difference is greater than a given value. The phase error pulse 50 is a logical signal and a quality of the reproduced signal can be evaluated by counting the pulse.

In the digital section 20, the phase error pulse 50, the clock 51, the NRZI data 52, and the data 53 synchronized by the clock are input signals. The timing controller 21 controls timings for integrating these pulses in a specified area, normally, a single sector. The mark length analyze unit 22 calculates how many marks and spaces each having a given length are included in the single sector by using the data 53. The 8-16 modulation code used for a DVD-RAM, the mark and space lengths are 3 Tw to 14 Tw. In this diagram, marks and spaces in a range of 1 Tw to 16 Tw can be processed correspondingly to the 8-16 modulation code. The leading/trailing and pattern analyze unit counts phase error pulses conforming to the recording condition W set forth in the above (—, the previous space length, the corresponding mark length, the subsequent space length, —). In this diagram, there is shown an example assuming that each of the mark and space lengths is divided into four steps with a classification of pulse width conditions for forming a leading edge and those for forming a trailing edge. The above measurement information is fetched into the CPU which is not shown via the I/O memory 24 so as to be processed. To determine recording conditions by using this circuit, a specific pattern should be recorded into a disk while changing power, a pulse width, or a position or while combining and changing the power, the pulse width, and the position and then be reproduced to find a condition of minimizing the phase error pulse count of each element.

Next, a result of an examination is shown in a condition that the recording capacity of the DVD-RAM is 4.7 GB identical to that of the DVD-ROM. Its recording strategy is based on a strategy of the DVD-RAM shown in FIG. 2, using the first pulse position Tsfp and the last pulse end position Telp as functions of the previous space length and the subsequent space length to the corresponding mark length for a pattern-sensitive adaptive control. The clock length Tw is assumed to be 20 ns.

Figure 4:
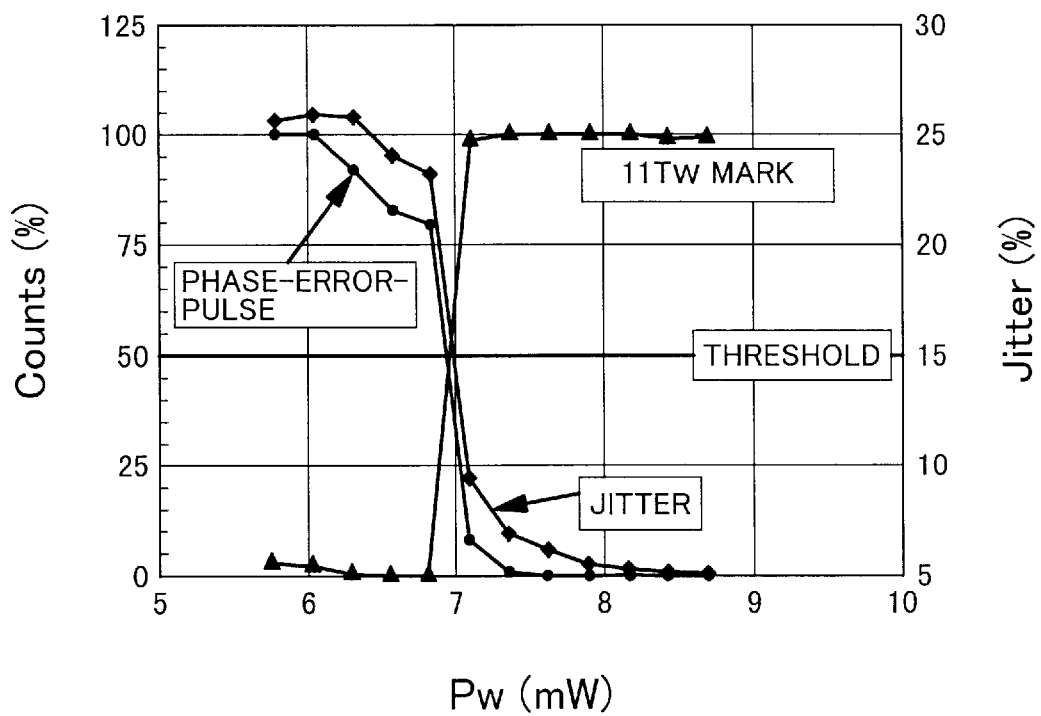
FIG. 4 is a diagram showing an embodiment of determining the recording power by the write parameter calibration according to the present invention.

Referring to FIG. 4, there is shown an embodiment of determining the recording power by write parameter calibration according to the present invention. For data to be recorded, a single signal is used which has 11 Tw of the mark and space length. The recording power Pw is 7 mW or greater and a jitter value is 15% or lower, which is a lower limit of the recording power, namely, a recording threshold. Around the recording threshold, the number of phase error pulses rapidly drops and the 11 Tw mark count increases up to a level of the number of marks included in the recorded data ±2%. Therefore, by calculating the change points of the phase error pulse count and the 11 Tw mark count as recording thresholds and obtaining an average of them, the power determination accuracy is improved in comparison with the conventional threshold detection using only the phase error pulse count. The recording power is obtained by multiplying the threshold 7 mW by, for example, coefficient 1.3 as 9.1 mW.

Figure 5:
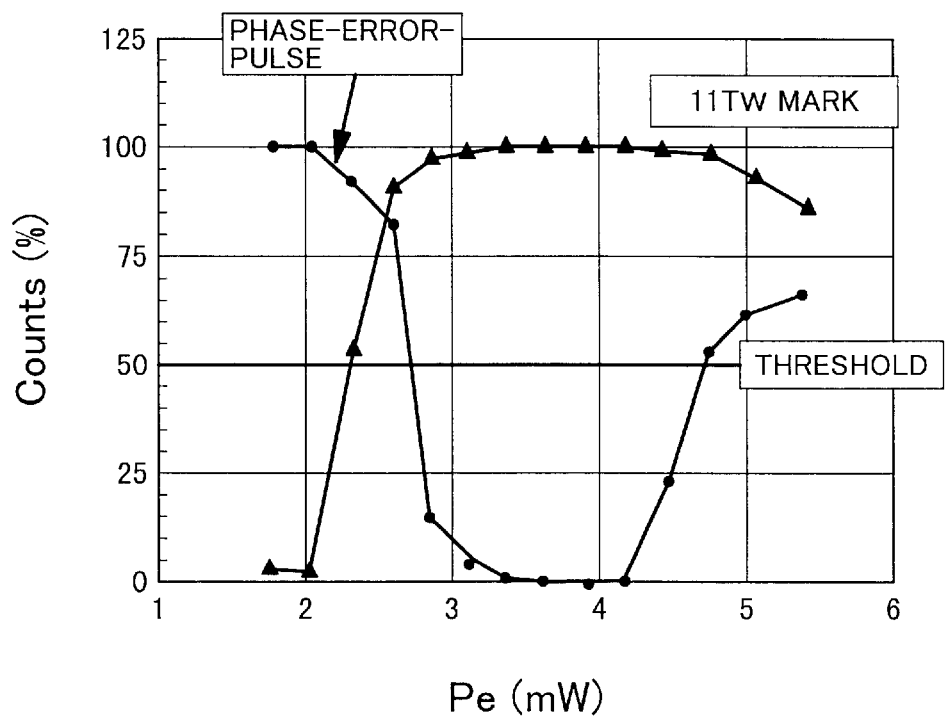
FIG. 5 is a diagram showing of an embodiment of determining the erase power by the write parameter calibration according to the present invention.

Referring to FIG. 5, there is shown an embodiment of determining erase power by the write parameter calibration according to the present invention. For data to be recorded, a single signal is used which has 11 Tw of the mark and space length and it is recorded twice repeatedly. The phase error pulse count is 50% or lower between 2.7 mW and 4.6 mW of the erase power Pe. The erase power is obtained from this data as an average of them, (2.7+4.6)/2=3.65 mW.

Referring to FIG. 6, there is shown a parameter table used for the adaptive control. The pulse width of the leading edge or the trailing edge is assumed to be controlled with 16 classes by dividing the marks and spaces into groups 3, 4, 5, and 6 Tw or greater. There are 32 independent parameters.

Referring to FIG. 7, there are shown recording data patterns for measuring an edge shift amount of the recorded mark conforming to the parameter table used for the adaptive control. To reduce the write parameter calibration process time, preferably a plurality of parameters can be determined at a single-time trial. In this diagram, recording patterns corresponding to 32 parameters are listed on respective lines. A numeral in parentheses in FIG. 7 indicates a pattern identical to one of other patterns and therefore there are 28 independent recording patterns. A total length of the recording patterns is 96 bytes and data can be recorded (2418/96=) 25 times by directly using the DVD-RAM sector configuration.

Figure 8:
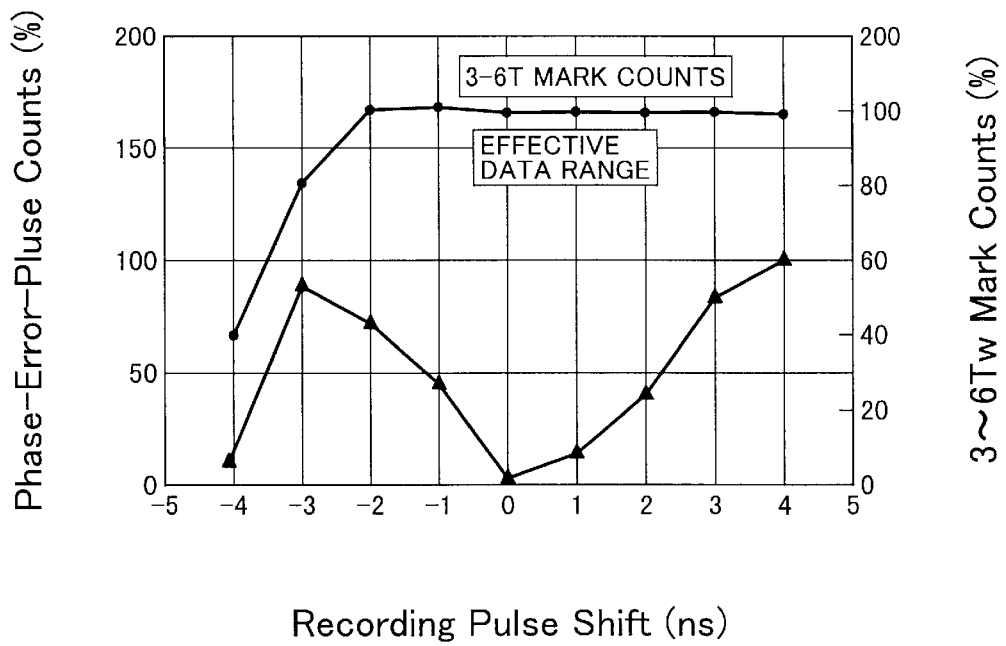
FIG. 8 is a diagram showing an example of the write parameter calibration for determining a pulse shift amount.

Referring to FIG. 8, there is shown an example of write parameter calibration for determining a pulse shift amount. The above recording patterns are recorded to examine the recording pulse shift amount and the number of reproduced phase error pulses. In this diagram, measured data is sampled out only for a leading edge of a 3 Tw mark after a 3 Tw space. Marks and spaces of 3 to 6 Tw are measured among the recording patterns and the plotting also includes a ratio of the total of the mark count obtained by reproduction to the mark count included in the above recording patterns. An effective data range is assumed to be a region of 90% or higher in the mark count and the reproduced mark count in the recording data patterns. Even if the mark length is actually 4 Tw in spite of attempting a formation of a mark having a 3 Tw length, a phase error pulse is used to detect only a phase relation between data and a clock, which results in less phase error pulses. A regulation of the effective data range by the mark count prevents the 3 Tw mark from being changed to the 4 Tw mark at the recording. A condition of minimizing the phase error pulse count within a range of the effective data is determined to be an optimum recording condition. By executing these processes for all the adaptive patterns, the adaptive control table is completed as shown in FIG. 6.

Figure 9:
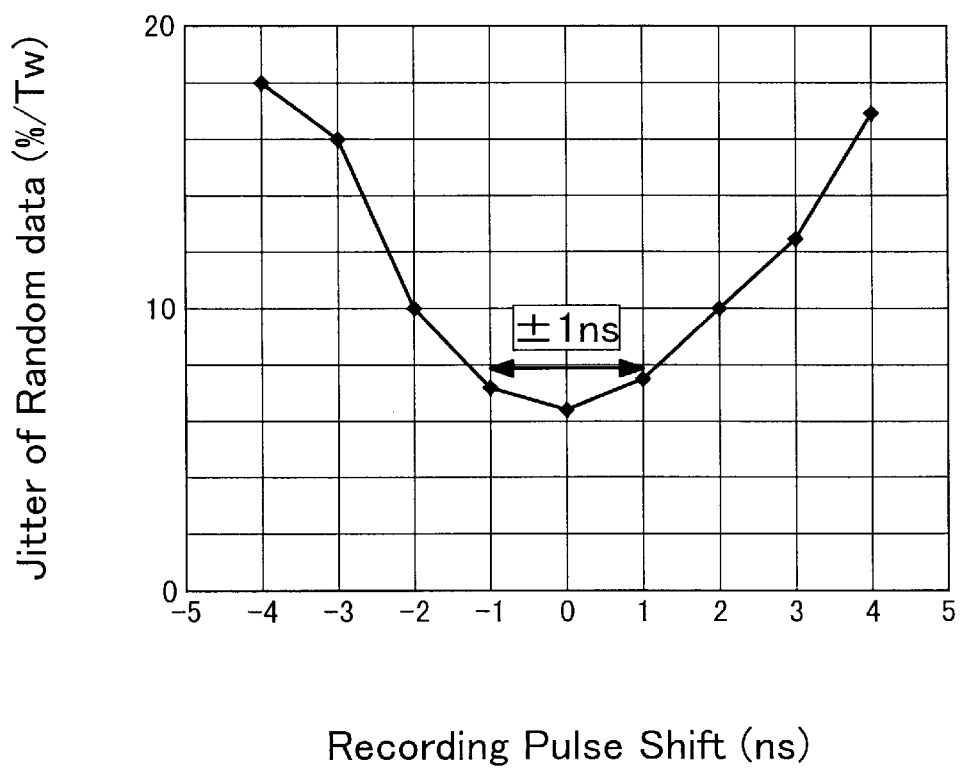
FIG. 9 is a diagram showing a jitter of a random pattern recorded when the pulse width is shifted from the optimum position.

Referring to FIG. 9, there is shown a jitter of a random pattern recorded when the pulse width is shifted from the optimum position. The minimum value of the jitter is approx. 7%. To suppress an increase of the jitter to 1% or smaller, a pulse shift need be ±1 ns, namely, about Tw/20.

Figure 10:
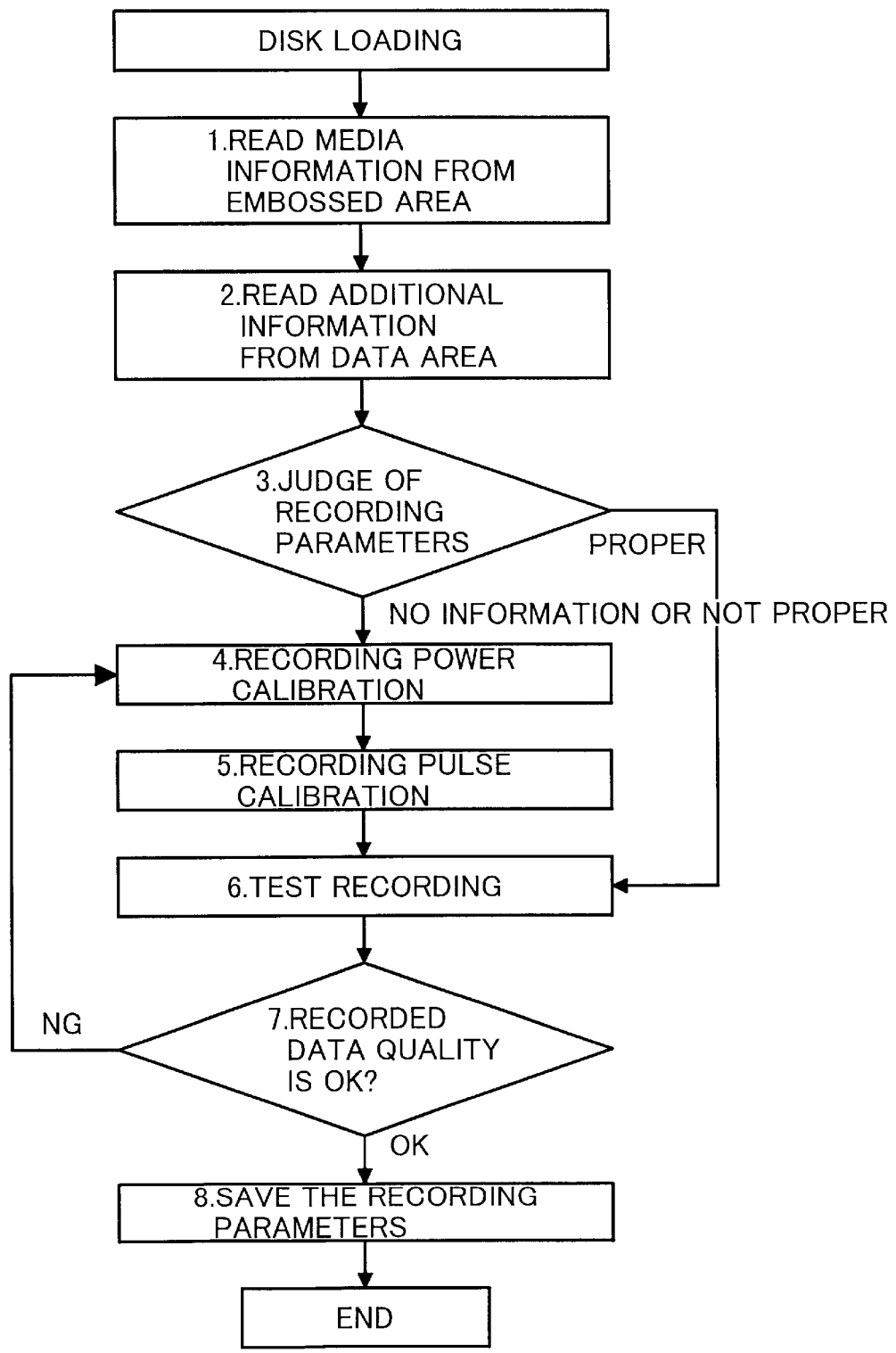
FIG. 10 is a diagram showing a sequence of the write parameter calibration.

Referring to FIG. 10, there is shown a sequence of the write parameter calibration according to the present invention. When a new disk is loaded, the write parameter calibration is executed. First, a disk manufacturer's name and recording conditions are read from an embossed area before reading of recording conditions recorded in specific blocks in a drive test area. Unless there are any recording conditions, write power calibration and write pulse calibration are executed sequentially to check a recorded data quality. The write power calibration is shown in FIGS. 4 and 5 and the write pulse calibration is shown in FIG. 8. Subsequently, in the recorded data quality check, random data is actually recorded in the disk and a byte error rate or the like at reproduction is read to check whether it is equal to or lower than a regular value. After that, the obtained recording conditions are recorded in a specific block such as a drive test area or the like. This enables the recorded data quality check without any execution of the write parameter calibration when the same disk is loaded again, thus being effective in reducing the loading time.

Figure 11:
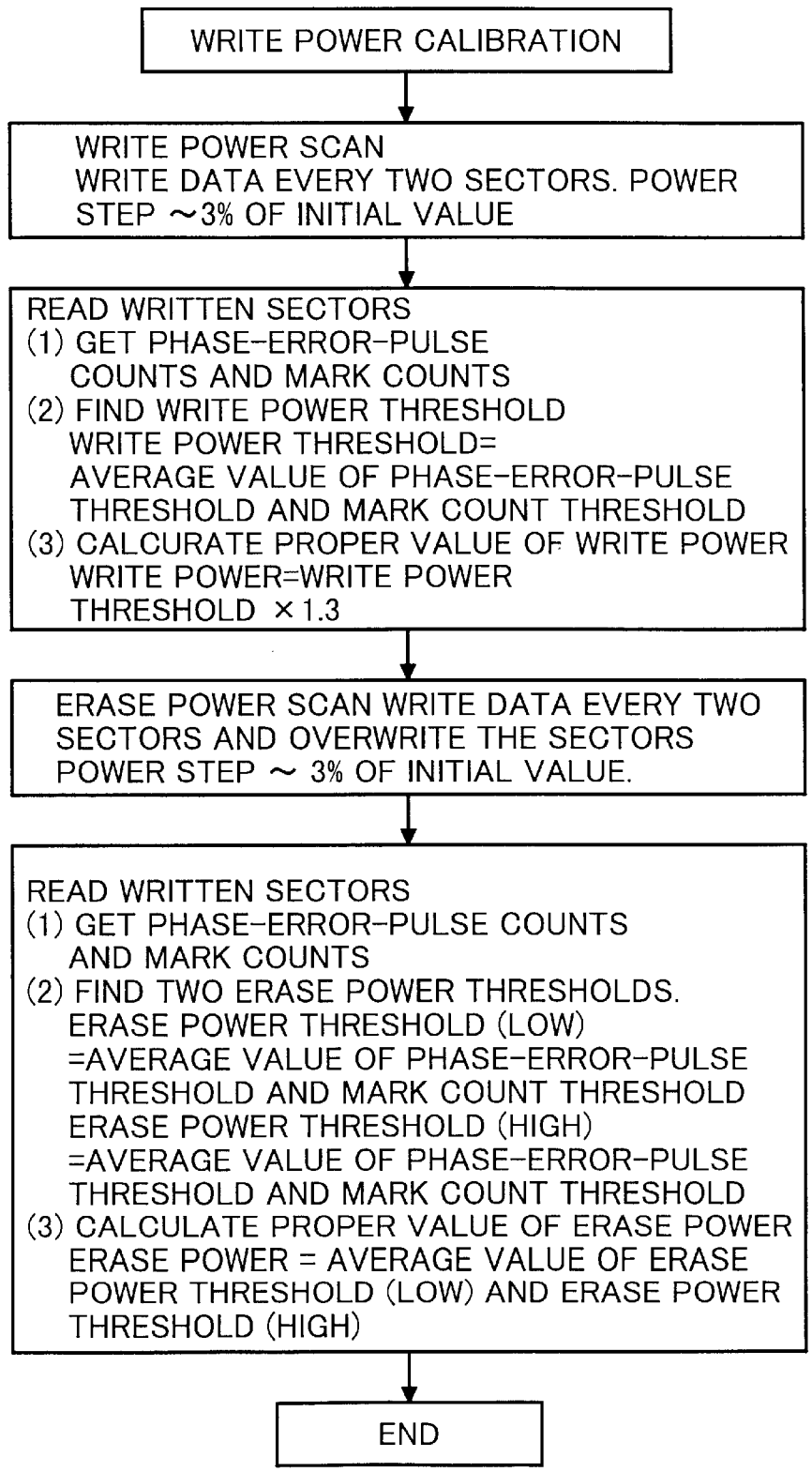
FIG. 11 is a diagram showing a sequence of the write power calibration.

Referring to FIG. 11, there is shown a sequence of the write power calibration. First, a recording threshold is searched for with changing recording power to determine the recording power. Next, erase power is optimized with changing the erase power.

Figure 12:
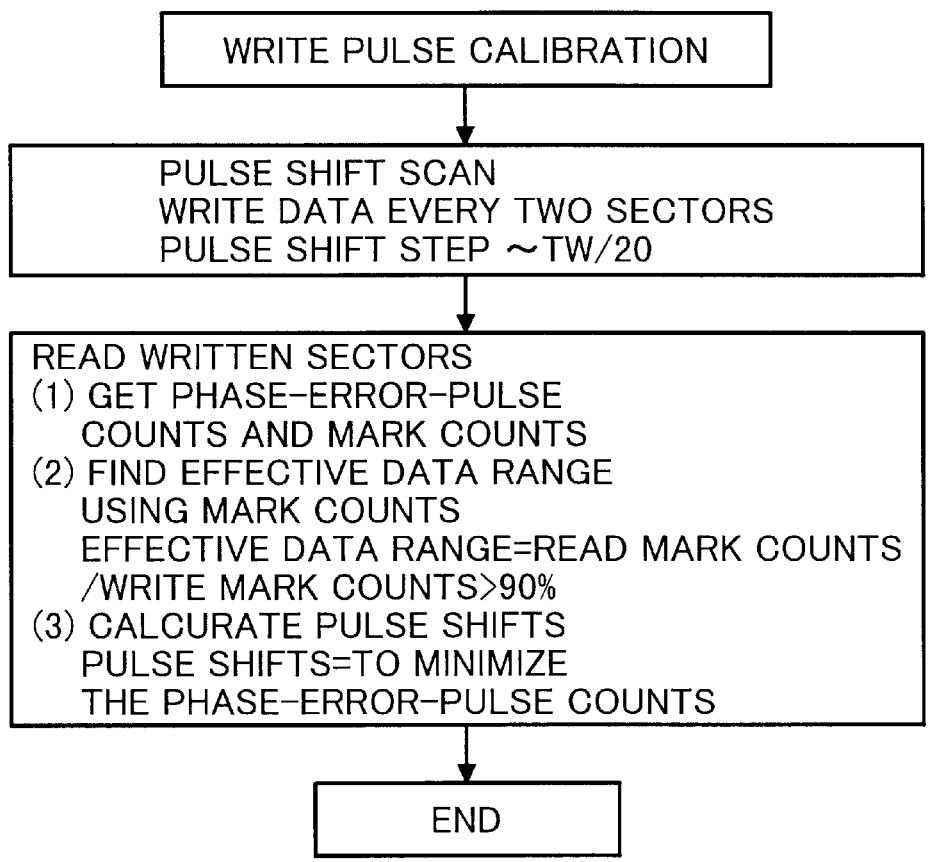
FIG. 12 is a diagram showing a sequence of the write pulse calibration.

Referring to FIG. 12, there is shown a sequence of the write pulse calibration. Data is recorded with changing a pulse shift amount and the condition minimizing the phase error pulse is determined conforming to all the adaptive control parameters.

Second Embodiment

An information recording/reproducing apparatus according to the present invention is described below.

Figure 13:
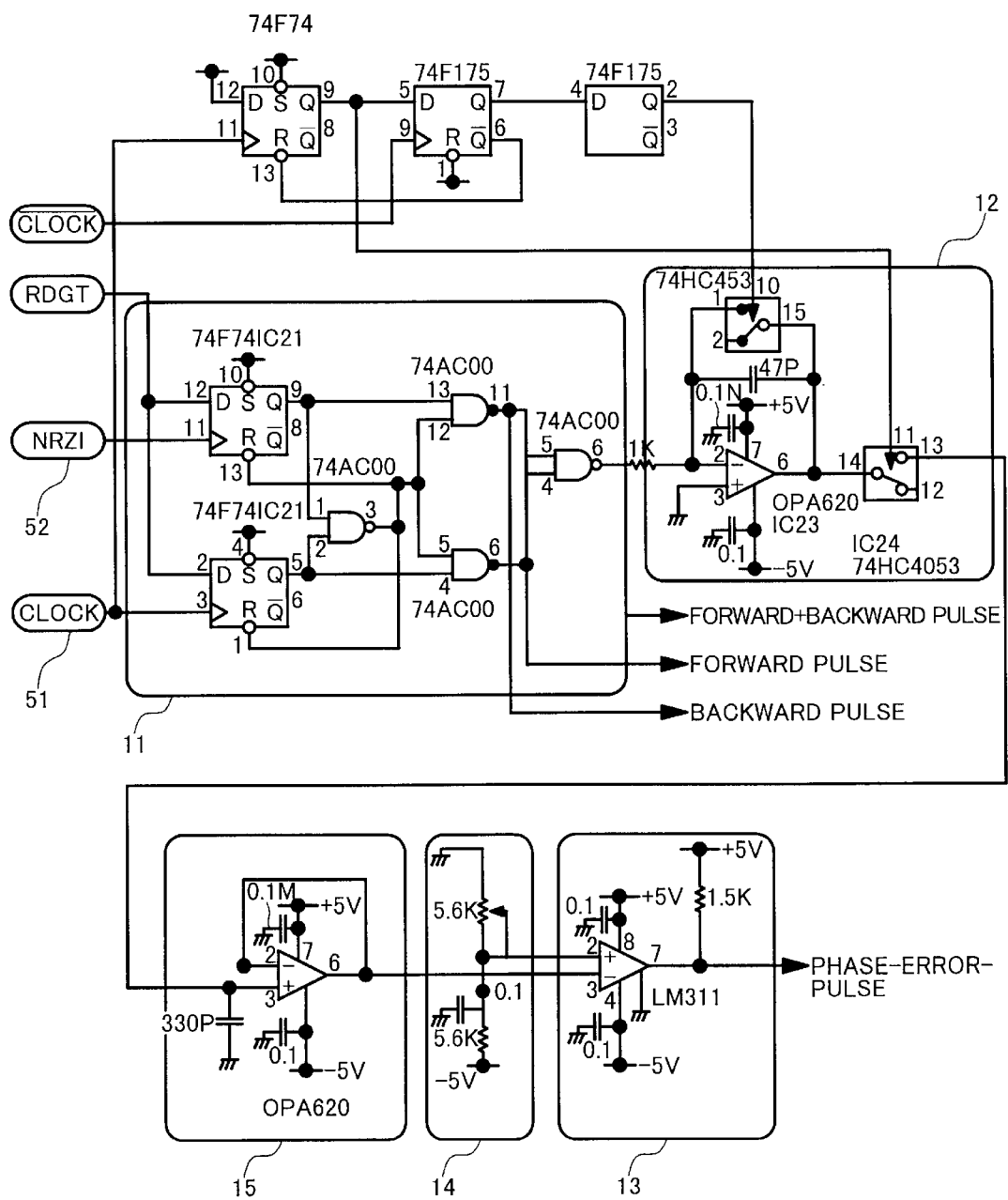
FIG. 13 is a diagram showing the circuit configuration of the phase difference detector used for the measurement.

Referring to FIG. 13, there is shown a circuit configuration of the phase difference detector used for the measurement. Respective components are the same as the analog section 10 shown in FIG. 1 actually developed to a circuit.

Figure 14A:
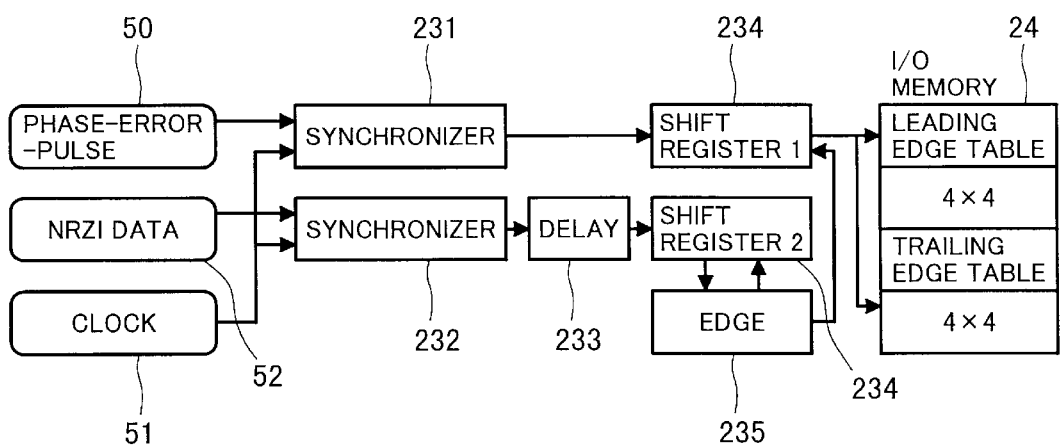
FIG. 14 is a diagram showing a configuration of the leading/trailing and pattern analyze unit used for the measurement and a determination point.
Figure 14B:
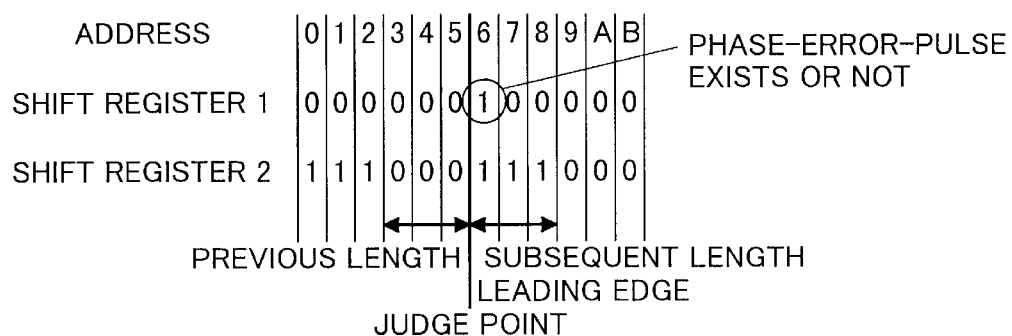

Referring to FIG. 14(a), there is shown a configuration of the leading/trailing and pattern analyze unit used for the measurement. Referring to FIG. 14(b), there is shown a determination point. As shown in FIG. 14(a), the phase error pulse 50 is synchronized with the NRZI data 52 by the clock 51 with a delay adjustment 233 and then it is guided to a shift register 234. As shown in FIG. 14(b), a pattern determination point is set between an address 5 and an address 6 of the shift register. If there is an information edge at this point, the following processes are executed:

(1) Leading/trailing Analysis

If the address 6 is set to value 1, a leading edge is applied. If it is value 0, a trailing edge is applied.

(2) Pattern Analysis

The previous length and the subsequent length are calculated and data is analyzed into respective patterns.

(3) Phase Error Pulse Classification

The phase error pulses are classified based on a result of the above (1) and (2) and counted.

Figure 15:
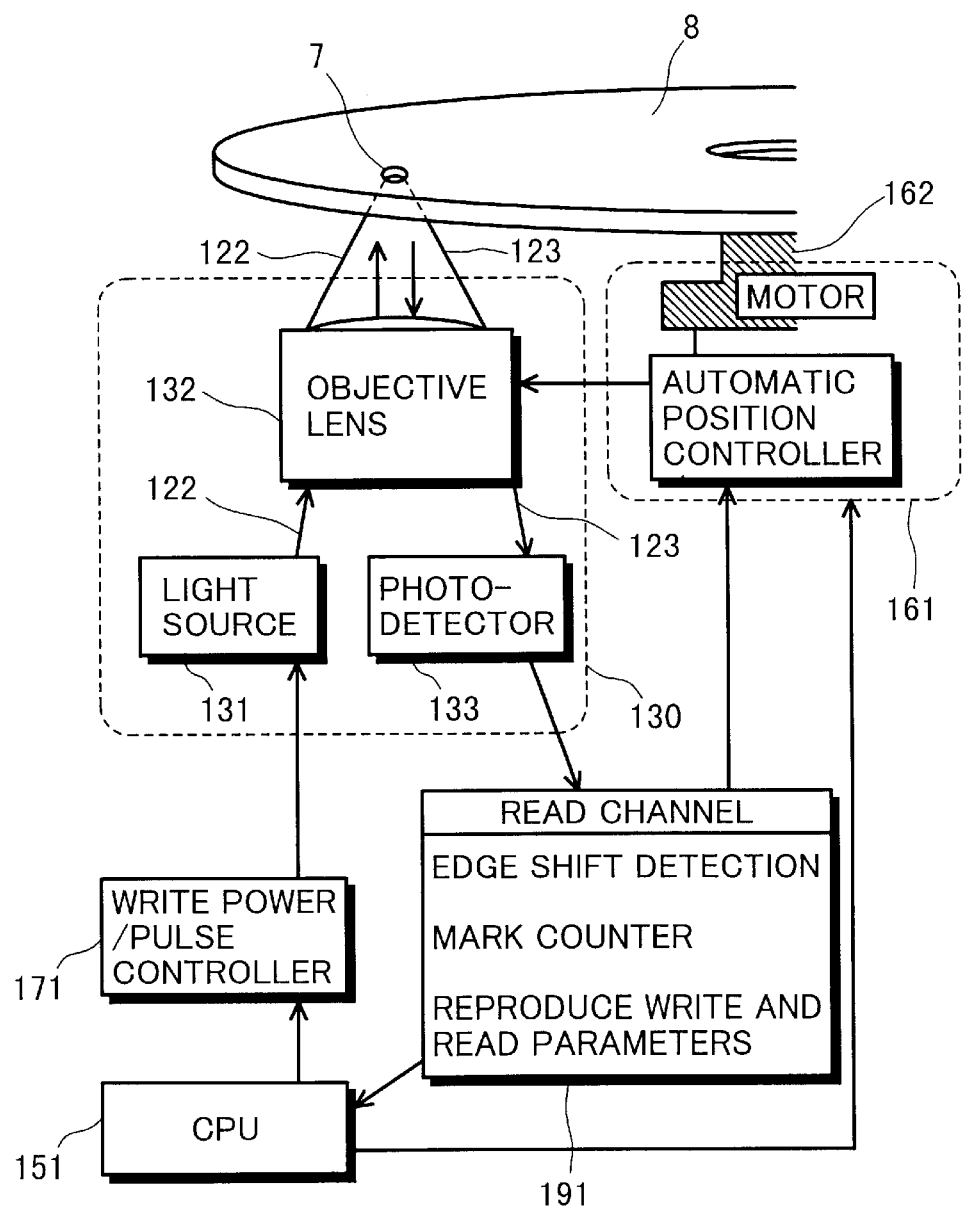
FIG. 15 is a diagram showing an example of an optical disk drive according to the present invention.

Referring to FIG. 15, there is shown an example of an optical disk drive according to the present invention. The optical disk medium 8 is rotated by the motor 162. The light intensity controller 171 generates a light 122 by controlling the light source 131 so as to achieve a light intensity commanded by the CPU 151 and the light 122 is condensed by the objective lens 132 to form a light spot 7 on the optical disk medium 8. By using the reflected light 123 from this light spot 7, the light is detected by the photo-detector 133. The photo-detector comprises a plurality of photodetectors. The read channel 191 reproduces information recorded on the optical disk medium by using the reproduced signal 130 from the photodetectors. The read channel 191 contains a detector for a write parameter calibration signal described in the first embodiment. At the write parameter calibration, as described in the first embodiment the CPU 151 has a function of recording write parameter calibration patterns with changing the recording power, a function of fetching the write parameter calibration signal detected by the write parameter calibration signal detector, and a function of determining optimum power by processing a result of the fetching. By using the information recording/reproducing apparatus according to the present invention, the optimum recording power is acquired by correcting a difference between mediums having different sensitivities or a fluctuation of the light spot, thereby enabling stable information recording and reproduction with high accuracy.

The information recording/reproducing apparatus according to the present invention enables a determination of high-accuracy recording or erase power and optimization of recording conditions depending on the previous and subsequent data patterns, thereby further increasing a recording capacity of the optical disk.

INDUSTRIAL APPLICABILITY

As set forth hereinabove, the optical disk drive and the information recording/reproducing apparatus using a light according to the present invention is useful as an apparatus for recording and reproducing a large amount of information at a high density and with high accuracy. Particularly, they are suitable for use as an apparatus for recording and reproducing high-density information stably.

What is claimed is:

1. A write parameter calibration method, comprising:

a process of recording data patterns on an information medium while controlling a recording condition according to the recording data patterns;

a process of reading the data patterns recorded on said information medium to acquire a reproduced signal;

a process of generating a clock signal from said reproduced signal;

a process of comparing a phase difference between said reproduced signal and said clock signal with a given value and generating pulses according to a result of the comparison;

a process of classifying data patterns of said reproduced signal into respective pattern groups;

a process of classifying said pulses into said classified pattern groups;

a process of counting said classified pulses; and a process of determining a recording condition according to said recording data pattern on the basis of a result of said counting a process of detecting a phase difference between the reproduced signal and a reference signal and a clock signal generated from the reproduced signal;

a process of discriminating the phase difference for classification according to said data pattern; and a process of determining the recording condition according to said discriminated phase difference.

2. The method according to claim 1, wherein said information medium is a disk-type optical information recording medium;

wherein said reference signal is a clock signal generated from the reproduced signal; and wherein said recording condition is power, a pulse width, or a position of an emitted laser beam.

3. An optical disk drive, which is an information device for recording and reproducing information on said information medium, at least comprising:

means for rotating said information medium;

means for condensing semiconductor laser beams into said information medium; and laser driving means for modulating an output, a pulse width, or a position of said semiconductor laser according to recorded data, wherein it has means for determining a condition for recording into said information medium using the write parameter calibration method according to claim 1.

4. The optical disk drive according to claim 3, further comprising:

means for recording said recording condition determined by said write parameter calibration method into a specific area of said information medium; and means for reproducing said recording condition recorded on said information medium.

5. The method according to claim 1, wherein said process of comparing said phase difference with a given value and generating pulses according to the comparison result is a process of generating pulses when said phase difference is greater than said given value.

6. A write parameter calibration method, comprising:

a process of recording data patterns on an information medium while controlling a recording condition according to said recording data patterns;

a process of reading the data patterns recorded on said information medium to acquire a reproduced signal;

a process of generating a clock signal from said reproduced signal;

a process of comparing a phase difference between said reproduced signal and said clock signal with a given value and generating pulses according to a result of the comparison;

a process of classifying data patterns of said reproduced signal into respective pattern groups;

a process of classifying said pulses into said classified pattern groups;

a process of counting said classified pulses; and a process of measuring a number of marks or of spaces included in said reproduced signal;

a process of comparing the number of marks or of spaces included in said reproduced signal with a number of marks or of spaces included in said recorded data patterns; and a process of determining a recording condition according to said recording data pattern on the basis of a result of said counting a process of measuring the number of marks or of spaces included in the reproduced signal;

a process of comparing the number of marks or of spaces in the reproduced data with the number of marks or of spaces in the recorded data; and a process of determining the recording condition according to a result of the comparison.

* * * * *